United States Patent
Chu et al.

(10) Patent No.: US 7,512,830 B2
(45) Date of Patent: Mar. 31, 2009

(54) MANAGEMENT MODULE FAILOVER ACROSS MULTIPLE BLADE CENTER CHASSIS

(75) Inventors: Simon C. Chu, Chapel Hill, NC (US); Richard A. Dayan, Raleigh, NC (US); Brandon J. Ellison, Raleigh, NC (US); Eric R. Kern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 10/845,874

(22) Filed: May 14, 2004

(65) Prior Publication Data

US 2005/0257213 A1    Nov. 17, 2005

(51) Int. Cl.
  *G06F 11/00*    (2006.01)
(52) U.S. Cl. ............................... 714/4; 714/5
(58) Field of Classification Search ............ 714/4, 714/5, 6, 11, 12, 13; 717/170
See application file for complete search history.

(56) References Cited

U.S. PATENT DOCUMENTS

| | | | |
|---|---|---|---|
| 5,016,244 A | 5/1991 | Massey, Jr. et al. | |
| 5,136,498 A | 8/1992 | McLaughlin et al. | |
| 5,996,086 A | 11/1999 | Delaney et al. | |
| 6,012,150 A | 1/2000 | Bartfai et al. | |
| 6,128,750 A | 10/2000 | Espy et al. | |
| 6,145,089 A * | 11/2000 | Le et al. | 714/4 |
| 6,272,386 B1 | 8/2001 | McLaughlin et al. | |
| 6,285,656 B1 | 9/2001 | Chaganty et al. | |
| 6,393,485 B1 | 5/2002 | Chao et al. | |
| 6,490,632 B1 | 12/2002 | Vepa et al. | |
| 6,560,717 B1 | 5/2003 | Scott et al. | |
| 6,606,253 B2 | 8/2003 | Jackson et al. | |
| 6,625,747 B1 * | 9/2003 | Tawil et al. | 714/6 |
| 6,985,956 B2 * | 1/2006 | Luke et al. | 709/229 |

OTHER PUBLICATIONS

Automatic System Positioning within a Rack Based on Dynamic UUID Generation, International Business Machines Research Disclosure, Dec. 2001, pp. 2106-2107.

\* cited by examiner

*Primary Examiner*—Dieu-Minh Le
(74) *Attorney, Agent, or Firm*—Dillon & Yudell LLP

(57) ABSTRACT

A method and system for a failover management module for a server blade chassis. A virtual out-of-band network connects management modules in different server blade chassis. Upon a detection of a failure of the management module(s) in a first server blade chassis, a management module in a second server blade chassis takes over control of the first server blade chassis.

18 Claims, 4 Drawing Sheets

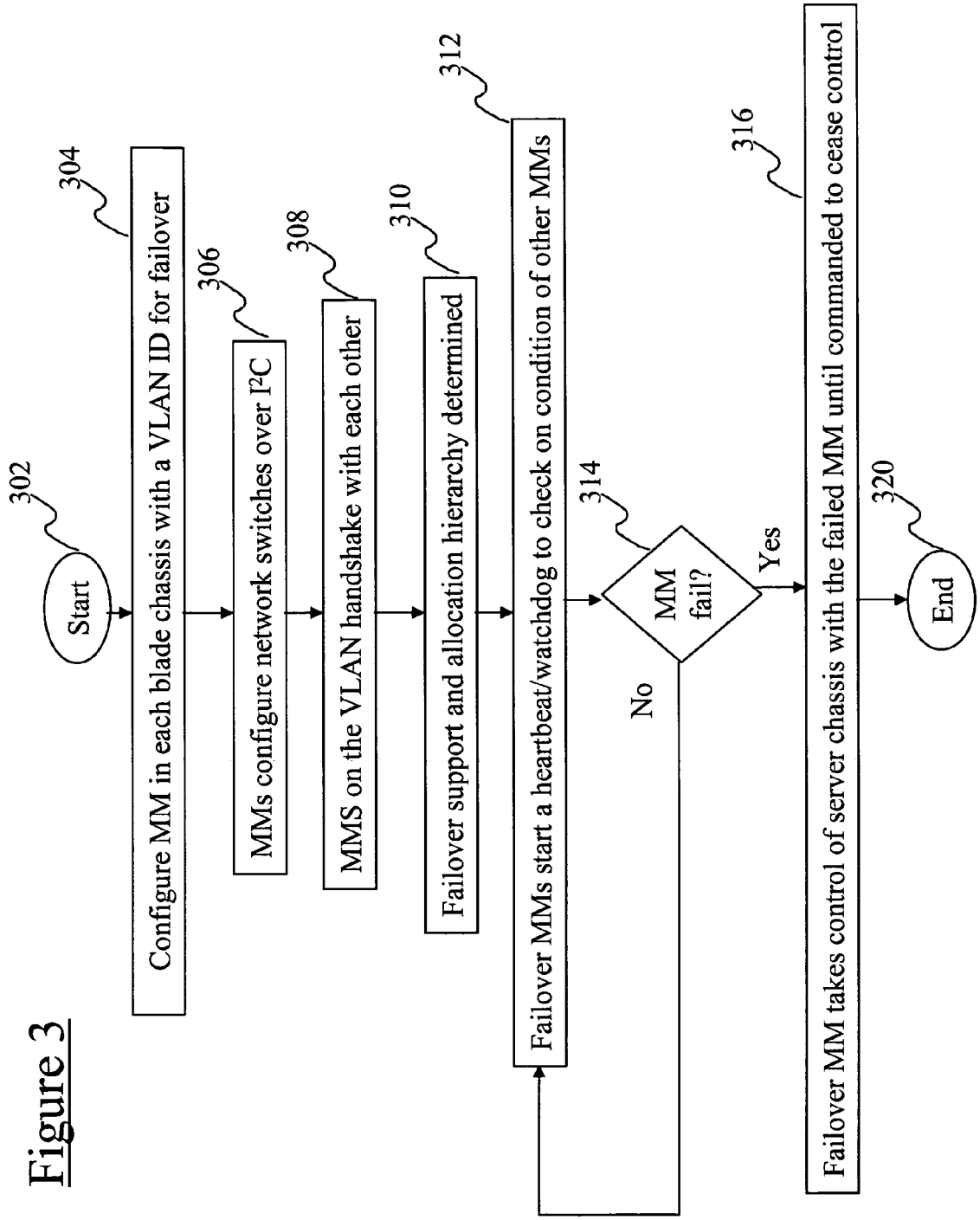

MANAGEMENT MODULE FAILOVER ACROSS MULTIPLE BLADE CENTER CHASSIS

BACKGROUND OF THE INVENTION

1. Technical Field

The present invention relates in general to the field of computers, and in particular to multiple blade servers housed in a server chassis. Still more particularly, the present invention relates to a method and system for a remote management module taking over operation of a server chassis if the server chassis' internal management modules fail.

2. Description of the Related Art

Server blade computers offer high-density server boards (blades) in a single server blade chassis (blade center chassis). A typical server blade computer is illustrated in FIG. 1, identified as server blade chassis 102. Server blade chassis 102 includes multiple hot-swappable server blades 104*a-n*. There are typically fourteen server blades 104 in server blade chassis 102. The operations of server blades 104 are coordinated by logic identified as management modules 108, each of which typically includes a processor for controlling input/output (I/O) functions, interfacing with a network 106 (such as the Internet or a Local Area Network), and allocating jobs and data to the different server blades 104. Typically, a first management module 108*a* is designated as the primary management module, and a second management module 108*b* is a back-up to be used if the primary management module 108*a* should fail.

Another function of management module 108 is to control a power module 110 and cooling fans 112. The coordinated management of power module 110 and cooling fans 112 permits the server blades 104 to operate within their designed temperature ranges. That is, additional power demands from power module 110 generally translate into additional cooling demands from cooling fans 112, requiring them to be turned on or operated at a higher speed. Failure to properly control the cooling of server blade chassis 102 and the server blades 104 contained therein can be catastrophic, including permanent damage to the server blades 104 and circuitry associated with server blade chassis 102. Thus, if both management modules 108 should fail, then the temperature control is lost.

What is needed, therefore, is a method and system for providing a remote failover management module. Preferably, the failover management module would be activated by the detection of a failure of the server blade chassis' internal management module(s), followed by the reallocation of external management module resources.

SUMMARY OF THE INVENTION

Therefore, the present invention is directed to a method and system for a failover management module for a server blade chassis. A virtual out-of-band network connects management modules in different server blade chassis. Upon a detection of a failure of the management module(s) in a first server blade chassis, a management module in a second server blade chassis takes over control of the first server blade chassis.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 is a flow-chart of steps taken according to the present invention to appropriate a remote management module to control a server blade chassis that has a failed local management module(s).

DETAILED DESCRIPTION OF A PREFERRED EMBODIMENT

Figure 2A:
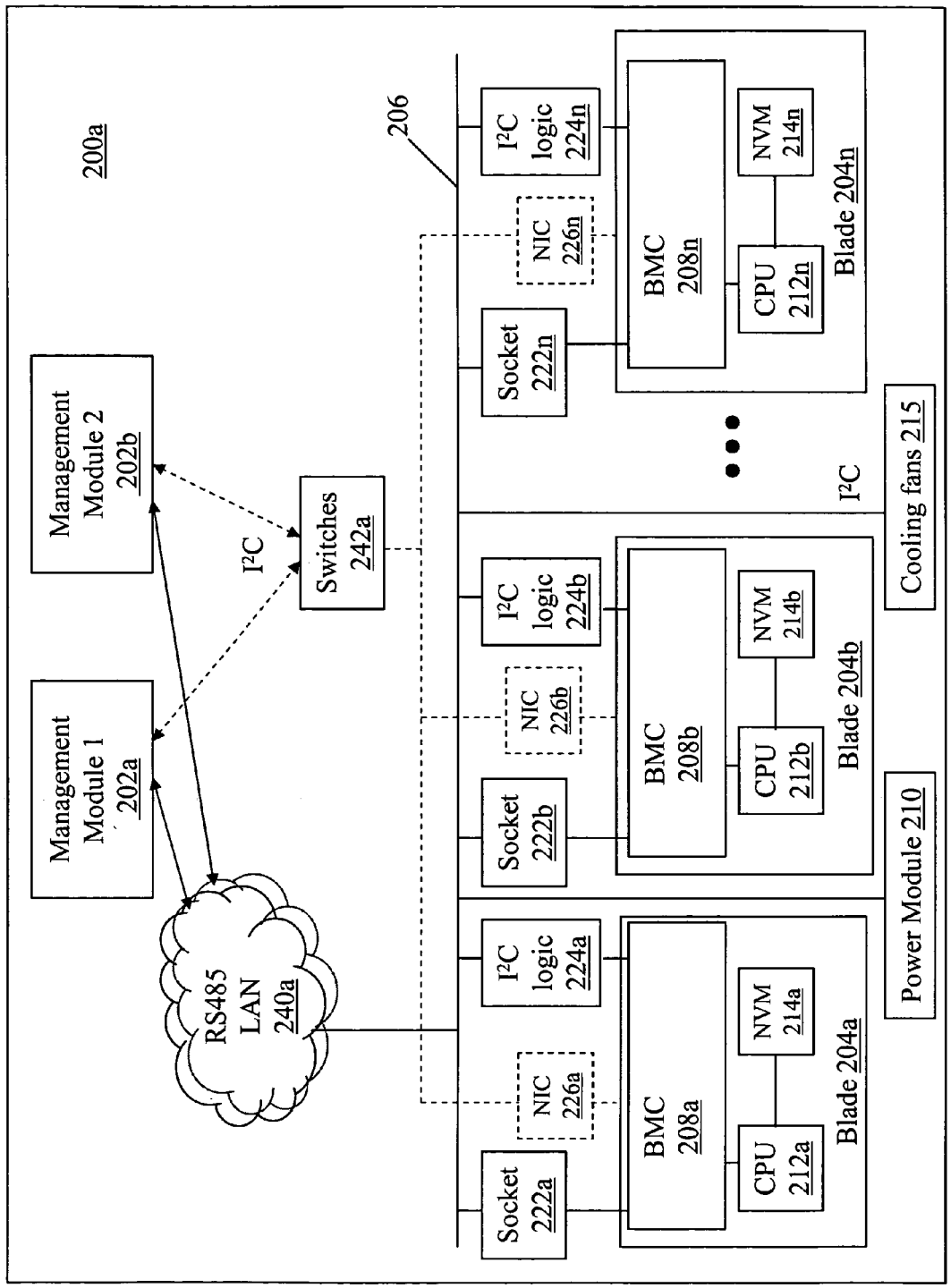
FIG. 2*a* illustrates a server blade chassis incorporating a Virtual Local Area Network (VLAN) that supports cross-communication between management modules in different server blade chassis.

With reference now to FIG. 2*a*, there is depicted a schematic block diagram of a server blade chassis 200*a* according to a preferred embodiment of the present invention. For the sake of clarity, only three server blades 204*a,b,n* are depicted. However, in a preferred embodiment, server blade chassis 200*a* has a midplane 206 capable of connecting fourteen or more server blades 204.

Server blade chassis 200*a* has one or more management modules 202. As depicted, server blade chassis 200*a* has a primary management module 202*a* and a back-up management module 202*b*. Each management module 202 is capable of managing multiple server blades 204. During normal operations, one of the local management modules 202*a* or 202*b* are coupled to server blades 204*a-n* via a Local Area Network (LAN) 240*a*, a midplane 206, and a plurality of Baseboard Management Controllers (BMCs) 208 (each server blade 204 having a BMC 208) to form an in-band management pathway LAN 240 and BMC 208 are discussed in further detail below.

Midplane 206 is a backplane, mounted in the middle of server blade chassis 200*a*, that contains circuitry and sockets 222 into which additional electronic devices or cards, including server blades 204 can be plugged. Midplane 206 contains at least one bus for secure in-band internal communication between management module 202 and server blades 204*a-n*, as well as between and among server blades 204*a-n* themselves, via respective BMCs 208*a-n*.

When a server blade 204 is plugged into a specific socket 222, a physical address is established for that server blade 204. For example, consider server blade 204*a* being plugged into socket 222*a*. A control logic, depicted as I2C logic 224*a*, which is compliant with the Phillips' Inter-IC (Inter-Integrated Circuit) standard (incorporated by reference in its entirety herein and commonly referred to as "$I^2C$"), detects the presence of server blade 204*a* in socket 222*a*. $I^2C$ logic 224*a*, operating in conjunction with management module 202, assigns a physical address on a bus in midplane 206 to server blade 204*a* when server blade 204*a* is plugged into socket 222*a*. Preferably, each server blade 204 is associated with a unique $I^2C$ logic 224, which is preferably connected to midplane 206 as depicted in FIG. 2*a*. Alternatively, all server blades 204 can use a single $I^2C$ logic 224.

Figure 1:
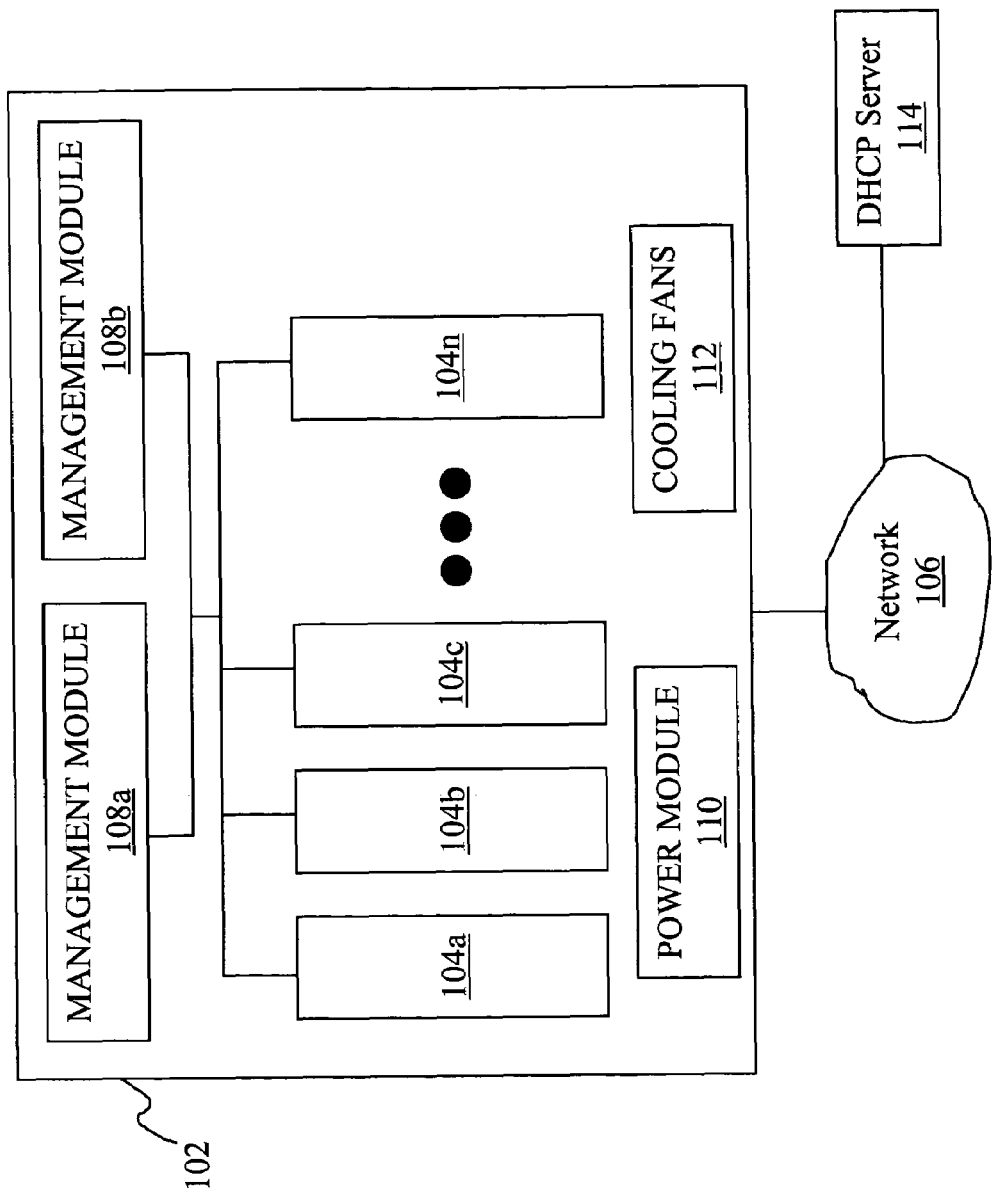
FIG. 1 depicts a prior art diagram of a server blade chassis coupled to a network.

Alternatively, each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server 114, as shown in FIG. 1, may be used to assign an IP address to server blade 204a. Communication with server blade 204a is thereafter via a Network Interface Card (NIC) 226a that is associated with server blade 204a. The communication pathway using switches 242a and NICs 226 is referred to as a out-of-band network.

Each server blade 204 has at least one central processing unit (CPU) 212, and a non-volatile memory (NVM) 214. Preferably, NVM 214 is a Flash Read Only Memory ("Flash ROM" or "Flash Memory"), which can be erased and reprogrammed in units of memory called blocks. NVM 214 may also include non-volatile Electrically Erasable Programmable Read Only Memory (EEPROM), which is similar to Flash Memory except that EEPROM is erased and rewritten at the byte level, and is usually smaller in capacity than the flash memory.

When a server blade 204 is shipped from a manufacturer, the NVM 214 is typically pre-burned with firmware, including a Basic Input/Output System (BIOS) as well as software for monitoring the server blade 204. Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

Management modules 202 are capable of detecting the presence, quantity, type and revision level of each server blade 204, power module 210, and midplane 206 in the system. Management modules 202 can also directly control the operation of each server blade 204 and the power module 210, and can directly (without using the BIOS in the server blades 204) or indirectly (using the BIOS) control the operation of cooling fans 215. More about how a management module 202 directly controls the operation of cooling fans 215 is discussed below.

Each server blade 204 has a Baseboard Management Controller (BMC) 208, which provides local supervisory control of the server blade 204 to which it is associated. Each BMC 208 is able to communicate with a local management module 202 by either using LAN 240a (in-band network) or alternatively by using switches 242a and NICs 226 (out-of-band network).

LAN 240 is an in-band network, preferably comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222. That is, the primary communication pathway between management module 202 and server blades 204 is the in-band network that comprises LAN 240, sockets 222, and BMC 208. The secondary communication pathway, which is used in the present invention if all of the local management modules 202 should fail, is the out of band network that comprises switches 242 and NICs 226.

Each BMC 208 can communicate directly with cooling fans 215, preferably via midplane 206 on an I$^2$C channel under the control of an I$^2$C logic 224. For example, management module 202a can communicate with a BMC such as BMC 208a, in order to control the operation of cooling fans 215. In a preferred embodiment, BMC's 208 have a backup hierarchy. That is, if BMC 208a, which had been designated as the BMC through which management module 202a communicates with cooling fans 215, is inoperable, then management module 202a will communicate with cooling fans 215 via an alternate BMC, such as BMC 208b. If BMC 208b is also inoperable, then alternate BMCs 208 are tried, according to a predetermined hierarchy, until an operable BMC is located. This BMC hierarchy of backups is used whether the in-band or out-of-band network is in use.

Figure 2B:
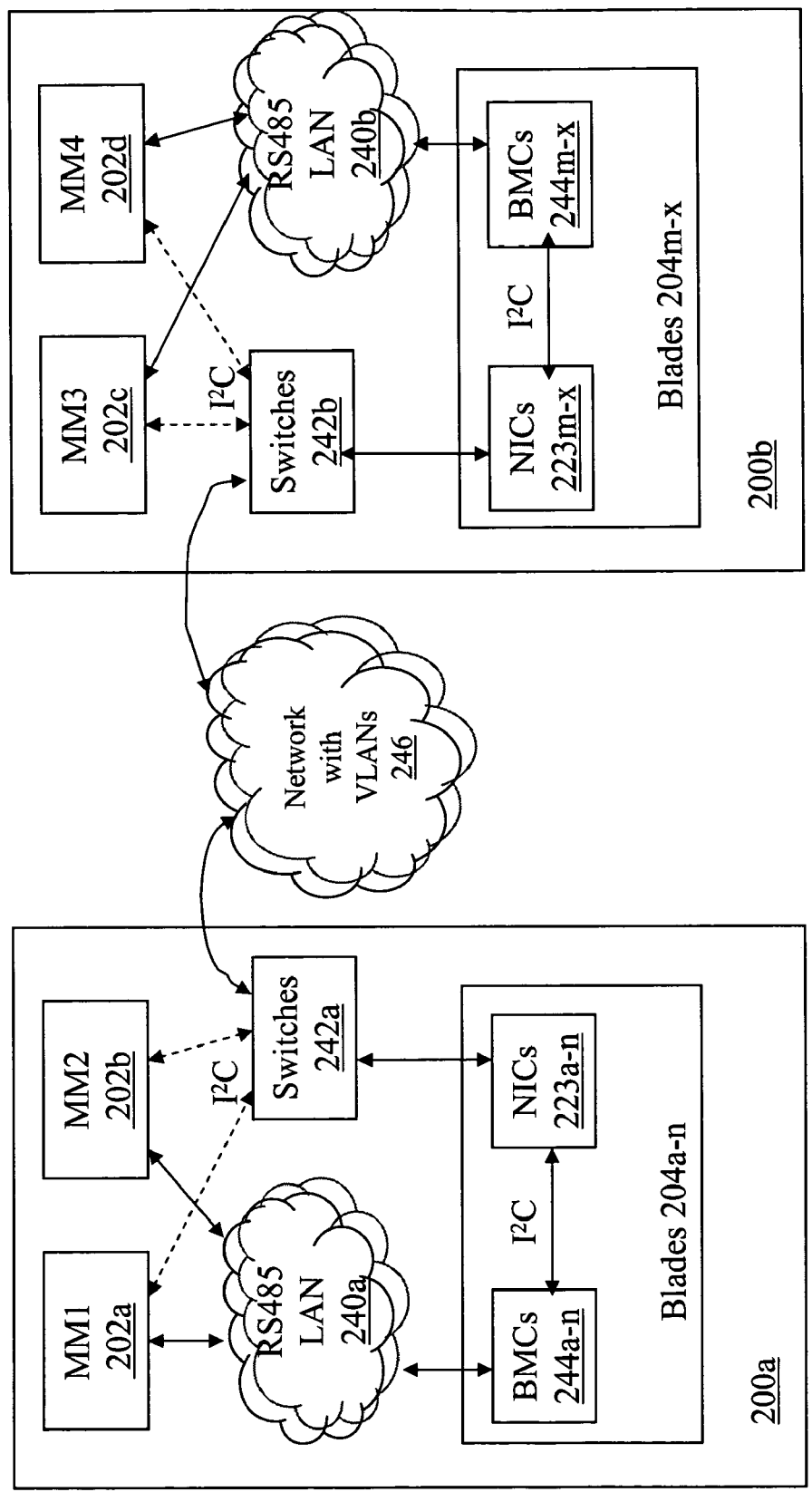
FIG. 2*b* depicts multiple server blade chassis, such as the exemplary server blade chassis illustrated in FIG. 2*a*, coupled by the VLAN.

With reference now to FIG. 2b, there is depicted a Virtual Local Area Network (VLAN) 246 that couples a first server blade chassis 200a to a second server blade chassis 200b. As depicted in an exemplary manner, VLAN 246 affords an out-of-band network between management modules 202 in different server blade chassis 200 via switches 242. First server blade chassis 200a has a plurality of server blades 244a-n, which are under the control of management module 202a or 202b, via LAN 240a (in-band network) or switches 242a (out-of-band network). Similarly, second server blade chassis 200b has a plurality of server blades 244m-x, which are under the control of management module 202c or 202d, via LAN 240b (in-band network) or switches 242b (out-of-band network). FIG. 2b will be referenced below when discussing the flow-chart of FIG. 3.

With reference now to FIG. 3, there is depicted a flow-chart of steps taken in a preferred embodiment of the present invention to provide management module failover across blade center chassis. After initiator block 302, at least one management module is configured in each blade chassis (block 304). Preferably, there will be a primary management module and a local back-up management module configured.

Each management module in the blade center (server blade chassis) is configured with a Virtual Local Area Network (VLAN) identifier (ID). The VLAN defines (maps) management modules according to their physical location (which server blade chassis houses the management module) as well as the failover hierarchy of the management modules, as described in further detail below in block 310.

Each management module configures network switches over an I$^2$C channel in the server blade chassis containing that management module. Referring again to FIG. 2b, then, management module 202a (MM1) and management module 202b (MM2) configure switches 242a using the I$^2$C channel, which is "out-of-band" since the I$^2$C channel is an alternative channel to the "in band" channel that uses the RS485 LAN 240a.

At step 308 in FIG. 3, each management module in each server blade chassis "handshakes" with the management module(s) within the same server blade chassis as well as management modules in other server blade chassis. As seen in FIG. 2b then, exemplary management module 202a (MM1) establishes a communication with management module 202b (MM2) in server blade chassis 200a via the I$^2$C channel, as well as with management module 202c (MM3) and management module 202d (MM4) in server blade chassis 200b via network 246.

At step 310, failover support presence and hierarchy is determined. For example, consider the management modules 202 depicted in FIG. 2b. The VLAN in network 246 can map the management modules 202 such that management module 202a (MM1) and then management module 202b (MM2) back up management module 202c (MM3), while management module 202b (MM2) and then management module 202c (MM3) back up management module 202a (MM1), and management module 202a (MM1) and then management module 202c (MM3) back up management module 202b (MM2). Management module 202d (MM4) can likewise be part of the management module backup hierarchy by being part of the above described backup chain. Similarly, a backup hierarchy of BMCs, as described above, can be established to accommodate situations in which a primary BMC is unavailable or inoperable.

With reference again to FIG. 3, the failover management modules start a heartbeat/watchdog to check on the condition of other management modules (block 312). The heartbeat/watchdog is a routine that periodically "pings" other management modules to confirm that the other management modules are operational, and particularly to determine if both the primary management module and the backup management module(s) in another server blade chassis are operational. Note, however, that the present invention can be used to backup any management module from any server blade chassis, including a local server blade chassis.

If pinging determines that both the primary and backup management module(s) are inoperable, then the failover management module immediately takes control over the server blade chassis having the failed management modules (block 316). In a preferred embodiment, this control, which includes but is not limited to control of operation of the cooling fans in the server blade chassis having the failed management modules, is implemented through communication with the Baseboard Management Controllers (BMCs) that has supervisory control of the cooling fans in the failed chassis, preferably using the protocol established in the Intelligent Platform Management Interface (IPMI) Specification, Version 2.0 or later, established by Intel, Hewlett-Packard, NEC and Dell, and herein incorporated by reference in its entirety. Preferably, this control is initiated by a command from the VLAN that coupled the first and second server blade chassis that respectively house the failover (backup) and the failed (inoperable) management module.

The control of the remote server blade chassis by the failover management module continues until commanded to cease (block 320), preferably by a signal from the originally failed management module indicating that the failed management module is once again operational. Alternatively, the backup control by the failover management module continues until instructed by a system administrator or a software management routine.

The present invention thus provides a reliable method and system for monitoring management modules for failure, and automatically providing a failover management module (reallocating another management module) to back up the failed management modules, preferably when all management modules in a server blade chassis fail contemporaneously.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method, comprising:
configuring with unique management module identifier each of a plurality of management modules disposed in a first server blade chassis which includes a plurality of server blades;
establishing communication between a first management module among the plurality of management modules disposed in a first server blade chassis and a second management module disposed in a second server blade chassis;
monitoring an operational condition of the second management module; and
in response to the second management module failing, allocating the first management module to assume all operation of the failed second management module.

2. The method of claim 1, wherein the second server blade chassis has multiple management modules, and wherein the first management module assumes the control of the second server blade chassis only upon a failure of all of the multiple management modules in the second server blade chassis.

3. The method of claim 1, wherein communication between the first and second management modules is via an out-of-band Virtual Local Area Network (VLAN) using the unique management module identifier for each of the first and second management modules.

4. The method of claim 3, wherein the VLAN assigns a hierarchy of backup support among multiple management modules disposed in the first and second server blade chassis.

5. The method of claim 1, wherein the first management module controls a cooling fan in the second server blade chassis via a first Baseboard Management Controller (BMC) disposed in a first server blade in the second server blade chassis where the second management module has failed.

6. The method of claim 5, wherein if the first BMC becomes inoperable, then communication between the first management module and cooling fans in the second server blade chassis is via a second backup BMC disposed in a second server blade in the second server blade chassis.

7. A system, comprising:
a Virtual Local Area Network (VLAN) for configuring with unique management module identifiers a first management module disposed in a first server blade chassis which includes a plurality of server blades connected to a midplane and a second management module disposed in a second server blade chassis , such that communication can be established between the first and second management modules,
wherein the first management module monitors an operational condition of the second management module, and
wherein, in response to the second management module failing, the VLAN allocates the first management module to assume all operation of the failed second management module.

8. The system of claim 7, wherein the second server blade chassis has multiple management modules, and wherein the first management module assumes the control of the second server blade chassis only upon a failure of all of the multiple management modules in the second server blade chassis.

9. The system of claim 7, wherein communication between the first and second management modules is via a Virtual Local Area Network (VLAN).

10. The system of claim 7, wherein the VLAN assigns a hierarchy of backup support among multiple management modules disposed in the first and second server blade chassis.

11. The system of claim 7, wherein the first management module controls a cooling fan in the second server blade chassis via a first Baseboard Management Controller (BMC) disposed in a first server blade in the second server blade chassis where the second management module has failed.

12. The system of claim 11, wherein if the first BMC becomes inoperable, then communication between the first management module and cooling fans in the second server blade chassis is via a second backup BMC disposed in a second server blade in the second server blade chassis.

13. A computer program product, residing on a computer storage medium, comprising:
- program code for configuring with unique management module identifier each of a plurality of management modules disposed in a first server blade chassis which includes a plurality of server blades;
- program code for establishing communication between a first management module among the plurality of management modules disposed in the first server blade chassis and a second management module disposed in a second server blade chassis;
- program code for monitoring an operational condition of the second management module; and
- program code for, in response to the second management module failing, allocating the first management module to assume all operation of the failed second management module.

14. The computer program product of claim 13, wherein the second server blade chassis has multiple management modules, and wherein the first management module assumes the control of the second server blade chassis only upon a failure of all of the multiple management modules in the second server blade chassis.

15. The computer program product of claim 13, wherein communication between the first and second management modules is via a Virtual Local Area Network (VLAN).

16. The computer program product of claim 13, wherein the VLAN assigns a hierarchy of backup support among multiple management modules disposed in the first and second server blade chassis.

17. The computer program product of claim 13, wherein the first management module controls a cooling fan in the second server blade chassis via a first Baseboard Management Controller (BMC) disposed in a first server blade in the second server blade chassis where the second management module has failed.

18. The computer program product of claim 17, wherein if the first BMC becomes inoperable, then communication between the first management module and cooling fans in the second server blade chassis is via a second backup BMC disposed in a second server blade in the second server blade chassis.

* * * * *